US012236009B2

(12) United States Patent
Yasui et al.

(10) Patent No.: US 12,236,009 B2
(45) Date of Patent: Feb. 25, 2025

(54) CALIBRATION DEVICE, CALIBRATION METHOD, DRIVE RECORDER, VEHICLE, AND STORAGE MEDIUM

(71) Applicant: HONDA MOTOR CO., LTD., Tokyo (JP)

(72) Inventors: Yuji Yasui, Wako (JP); Masamitsu Tsuchiya, Wako (JP); Yutaka Nishizaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 373 days.

(21) Appl. No.: 17/684,050

(22) Filed: Mar. 1, 2022

(65) Prior Publication Data

US 2022/0283636 A1 Sep. 8, 2022

(30) Foreign Application Priority Data

Mar. 8, 2021 (JP) ................................. 2021-036642

(51) Int. Cl.
*G06F 3/01* (2006.01)
*G06V 40/16* (2022.01)

(52) U.S. Cl.
CPC .............. *G06F 3/013* (2013.01); *G06V 40/16* (2022.01)

(58) Field of Classification Search
CPC .............................. G06F 3/013; G06V 40/16
USPC ........................................................ 382/104
See application file for complete search history.

(56) References Cited

U.S. PATENT DOCUMENTS

| 8,538,044 | B2 | 9/2013 | Tsukizawa et al. |
| 10,977,488 | B2 | 4/2021 | Hirata |
| 11,062,158 | B2 | 7/2021 | Tanaka et al. |
| 11,881,035 | B2 * | 1/2024 | Yasui ............... G06V 40/18 |
| 11,933,719 | B2 * | 3/2024 | Chen ..................... H02N 2/12 |
| 2011/0249868 | A1 | 10/2011 | Tsukizawa et al. |
| 2014/0043459 | A1 | 2/2014 | Tsukizawa et al. |

(Continued)

FOREIGN PATENT DOCUMENTS

| CN | 102149325 A | 8/2011 |
| CN | 102510480 A | 6/2012 |

(Continued)

OTHER PUBLICATIONS

Office Action dated Jul. 29, 2024, issued in counterpart JP Application No. 2021-036642, with English translation. (4 pages).

(Continued)

*Primary Examiner* — Gabriel I Garcia
(74) *Attorney, Agent, or Firm* — WHDA, LLP (57) ABSTRACT

A calibration device for calibrating line-of-sight detection processing based on an image of a face of a user includes an instruction unit configured to instruct the user to look at each of a plurality of positions, and an acquisition unit configured to acquire, for each of the plurality of positions, the image of the face of the user looking at each position. The instruction unit is configured to, when giving an instruction to look at a position that is not in front of the user of the plurality of positions without moving the face, give an instruction to look in front of the user each time a position at which the user is instructed to look switches from one position that is not in front of the user to another position that is not in front of the user.

9 Claims, 6 Drawing Sheets

(56) References Cited

U.S. PATENT DOCUMENTS

| | | |
|---|---|---|
| 2015/0339527 A1 | 11/2015 | Plummer et al. |
| 2019/0011983 A1 | 1/2019 | Yasuda et al. |
| 2019/0147274 A1 | 5/2019 | Tanaka et al. |
| 2020/0134870 A1 | 4/2020 | Ban |
| 2020/0327324 A1 | 10/2020 | Hirata |
| 2022/0183636 A1* | 6/2022 | Maeta ............... H04N 5/76 |
| 2022/0237929 A1 | 7/2022 | Inagaki |

FOREIGN PATENT DOCUMENTS

| | | |
|---|---|---|
| CN | 109343700 A | 2/2019 |
| CN | 109784135 A | 5/2019 |
| CN | 110780742 A | 2/2020 |
| CN | 111290580 A | 6/2020 |
| CN | 111857333 A | 10/2020 |
| JP | 2009-183473 A | 8/2009 |
| JP | 2015-202197 A | 11/2015 |
| JP | 2017-129898 A | 7/2017 |
| JP | 2018-010465 A | 1/2018 |
| JP | 2020-181281 A | 11/2020 |
| WO | 2019/135281 A1 | 7/2019 |
| WO | 2020/250962 A1 | 12/2020 |

OTHER PUBLICATIONS

Office Action dated Nov. 20, 2024, issued in counterpart CN Application No. 202210198129.2, with English translation. (16 pages).

* cited by examiner

FIG. 6

CALIBRATION DEVICE, CALIBRATION METHOD, DRIVE RECORDER, VEHICLE, AND STORAGE MEDIUM

CROSS-REFERENCE TO RELATED APPLICATION(S)

This application claims priority to and the benefit of Japanese Patent Application No. 2021-036642 filed on Mar. 8, 2021, the entire disclosure of which is incorporated herein by reference.

BACKGROUND OF THE INVENTION

Field of the Invention

The present disclosure relates to a calibration device, a calibration method, a drive recorder, a vehicle, and a storage medium.

Description of the Related Art

A line-of-sight detection device for detecting a line of sight of an occupant may be mounted on a vehicle in order to provide an appropriate service to the occupant of the vehicle and record an action of the occupant. The line-of-sight detection device detects the line of sight of a person based on an image of the person's face. As a method for improving the accuracy of line-of-sight detection, Japanese Patent Laid-Open No. 2017-129898 describes a technique for calibrating a detection result of the line of sight.

SUMMARY OF THE INVENTION

The occupant of the vehicle (a driver in particular) moves his or her line of sight with different characteristics depending on the speed of the vehicle. Therefore, calibration of line-of-sight detection processing is also performed according to each characteristic. Performing calibration appropriately leads to the improvement of the accuracy of line-of-sight detection. Some aspects of the present disclosure provide a technique for improving the accuracy of line-of-sight detection.

According to an embodiment, a calibration device for calibrating line-of-sight detection processing based on an image of a face of a user includes an instruction unit configured to instruct the user to look at each of a plurality of positions, and an acquisition unit configured to acquire, for each of the plurality of positions, the image of the face of the user looking at each position. The instruction unit is configured to, when giving an instruction to look at a position that is not in front of the user of the plurality of positions without moving the face, give an instruction to look in front of the user each time a position at which the user is instructed to look to acquire the image of the user's face switches from one position that is not in front of the user to another position that is not in front of the user.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Some embodiments of the present disclosure relate to a line-of-sight detection device for detecting a line of sight of a user of a vehicle. The line-of-sight detection device also functions as a calibration device that calibrates line-of-sight detection processing based on an image of a user's face. In the following description, an embodiment in which the user is an occupant of the vehicle will be explained. That is, line-of-sight detection and calibration are performed in the vehicle. However, the following embodiments are also applicable to line-of-sight detection and calibration in other environments. The vehicle is typically a four-wheeled vehicle. However, the following embodiments may be applied to other types of vehicles. The occupant of the vehicle is typically a driver of the vehicle. However, the following embodiment may be applied to an occupant other than the driver, for example, an occupant in a passenger seat. In the following description, a case where line-of-sight detection for the driver as the occupant of the vehicle is performed will be explained.

Figure 1:
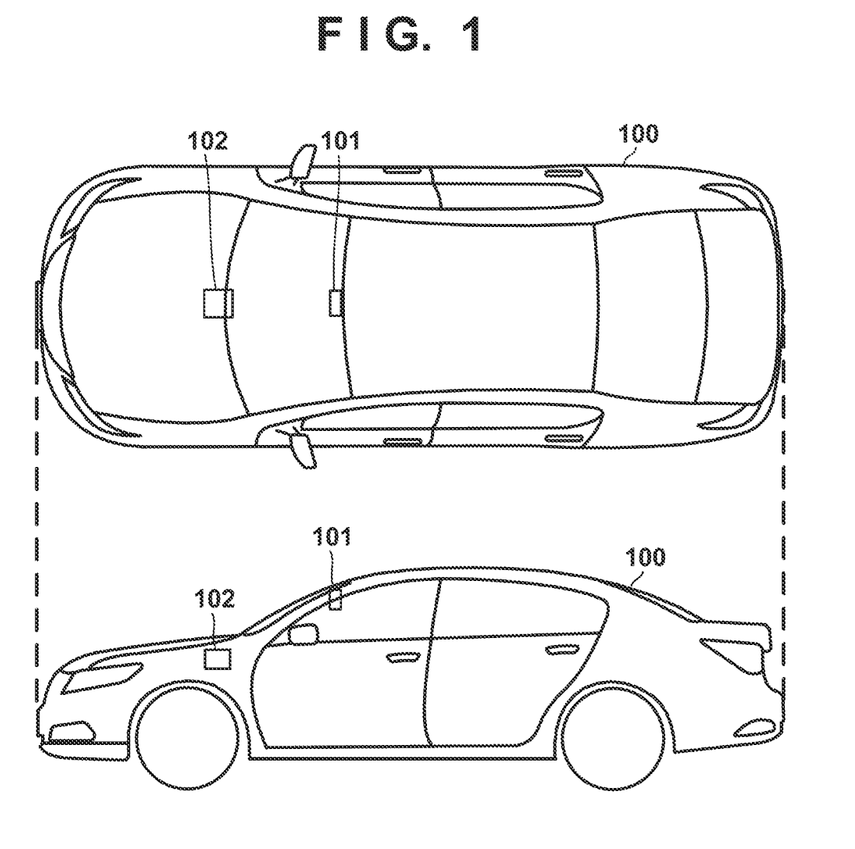
FIG. 1 is a schematic view illustrating a configuration example of a vehicle according to some embodiments of the present disclosure.

An example of a mounting position of the line-of-sight detection device will be described with reference to FIG. 1. A drive recorder 101 is mounted on a vehicle 100. In the example in FIG. 1, the drive recorder 101 is attached to a rearview mirror of the vehicle 100. The mounting position of the drive recorder 101 is not limited thereto, and may be any position where the occupant's face of the vehicle 100 can be captured. The drive recorder 101 functions as the line-of-sight detection device.

The drive recorder 101 may be operable as a single unit or may be operable in cooperation with a control device (for example, a control electronic control unit (ECU) 102) of the vehicle 100. When the drive recorder 101 is operable as a single unit, the drive recorder 101 may receive power supply from the vehicle 100.

Figure 2:
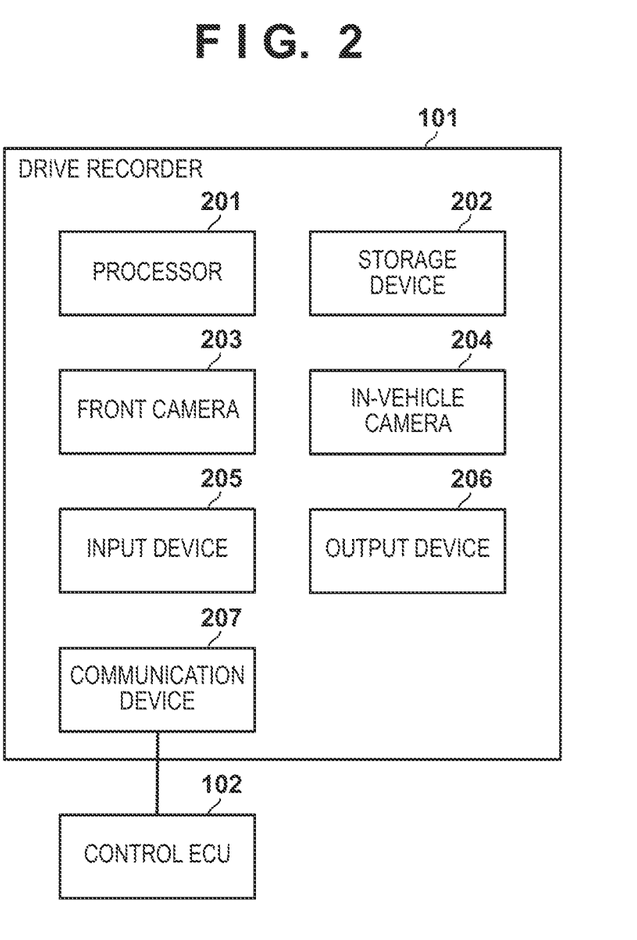
FIG. 2 is a block diagram illustrating a configuration example of a drive recorder according to some embodiments of the present disclosure.

A configuration example of the drive recorder 101 will be described with reference to FIG. 2. The drive recorder 101 includes a processor 201, a storage device 202, a front camera 203, an in-vehicle camera 204, an input device 205, an output device 206, and a communication device 207.

The processor 201 controls the overall operation of the drive recorder 101. The processor 201 may be realized by, for example, a central processing unit (CPU). The storage device 202 stores data related to the operation of the drive recorder 101. For example, the storage device 202 may store a program that specifies the operation of the drive recorder 101, temporary data during execution of the program, images captured by the front camera 203 and the in-vehicle camera 204, a result of line-of-sight detection of the driver, and the like. The storage device 202 may be realized by a memory such as a random access memory (RAM) or a read only memory (ROM). Furthermore, the storage device 202 may include an auxiliary storage device such as a solid state drive (SSD).

The front camera 203 is a camera for capturing a landscape in front of the vehicle 100. The front camera 203 may be, for example, a wide-angle camera. The front camera 203 is located on the front side of the drive recorder 101 (the front side of the vehicle 100). The in-vehicle camera 204 is a camera for capturing a landscape inside the cabin of the vehicle 100. The in-vehicle camera 204 may be, for example, a fisheye camera. The in-vehicle camera 204 is located on the rear side of the drive recorder 101 (the rear side of the vehicle 100).

The input device 205 is a device for inputting an instruction from the occupant of the vehicle 100. The input device 205 is realized by, for example, a button, a touch panel, or the like. The output device 206 is a device for outputting information to the occupant of the vehicle 100. The output device 206 may be a display device (for example, a liquid crystal display or an indicator) that provides visual information, may be a sound device (for example, a speaker) that provides auditory information, or may include both of them. Instead of or in addition to the drive recorder 101 having the output device 206, the drive recorder 101 may instruct the vehicle 100 to output information. The vehicle 100 that has received the instruction outputs information from its own output device (not illustrated) to the occupant.

The communication device 207 is a device that allows the drive recorder 101 to communicate with another device (for example, the control ECU 102). The communication device 207 may communicate with the other device in a wired manner or may communicate with the other device in a wireless manner. Wireless communication may be communication compliant with a protocol such as for short-range communication (for example, Bluetooth (registered trademark)). The communication device 207 may be omitted.

Figure 3:
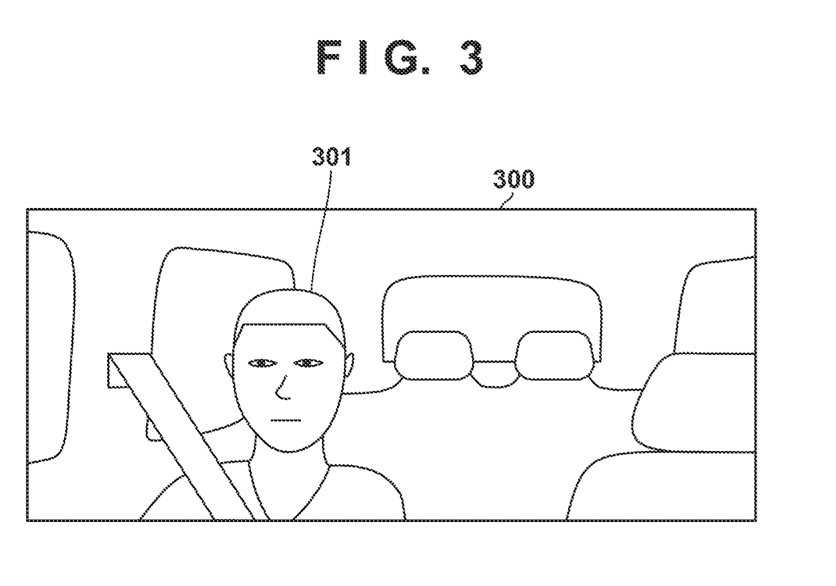
FIG. 3 is a view illustrating an image example of an inside of a cabin according to some embodiments of the present disclosure.

FIG. 3 illustrates an example of an image 300 captured by the in-vehicle camera 204 of the drive recorder 101. The image 300 shows the inside of the cabin of the vehicle 100, and specifically shows a driver 301. In this embodiment, the driver 301 is located on the left side of the image 300 because the vehicle 100 is a vehicle whose steering wheel is on the right. If the vehicle 100 is a vehicle whose steering wheel is on the left, the location is opposite.

Next, line-of-sight detection processing executed by the drive recorder 101 will be described. Line-of-sight detection processing is processing of detecting a line of sight of the driver (where the driver is looking at). Line-of-sight detection processing is performed by analyzing an image of the driver's face captured by the in-vehicle camera 204.

In general, the driver of the vehicle tends to direct his or her line of sight toward an object by moving his or her face while the vehicle is stopped, and tends to direct his or her line of sight toward an object by moving merely his or her eyes and moving his or her face as little as possible (keeping his or her face frontward) while the vehicle is travelling. Therefore, the drive recorder 101 performs line-of-sight detection processing in consideration of the speed of the vehicle 100. For example, when the speed of the vehicle 100 is 0, the drive recorder 101 performs line-of-sight detection processing by prioritizing the direction of the face. Line-of-sight detection processing that prioritizes the direction of the face as described above is hereinafter referred to as face priority processing. When the speed of the vehicle 100 is not 0, the drive recorder 101 performs line-of-sight detection processing by prioritizing the direction of the eyes. Line-of-sight detection processing that prioritizes the direction of the eyes as described above is hereinafter referred to as eye priority processing. The eyes may be irises, pupils, or a combination of the irises and the pupils.

The drive recorder 101 may perform the face priority processing and the eye priority processing by the same method as the existing method. For example, the drive recorder 101 may execute the processing as follows. In some embodiments, to execute the face priority processing, the drive recorder 101 detects the line of sight of the driver based on the position of each part (eyes, nose, mouth, etc.) in the contour of the driver's face included in the image. In the face priority processing, the position of the eyes may not be considered, or a low weight may be assigned to the line of sight based on the position of the eyes. To execute the eye priority processing, the drive recorder 101 detects the line of sight of the driver based on the position of the pupils of the driver's eyes included in the image. In the eye priority processing, the direction of the face may not be considered, or a low weight may be assigned to the line of sight based on the direction of the face.

In another embodiment, the drive recorder 101 may perform the face priority processing and the eye priority processing based on a model obtained by machine learning. For example, the storage device 202 of the drive recorder 101 may store two deep neural network (DNN) models: a model obtained by learning, as training data, an image of the driver obtained when the driver directs his or her line of sight toward the object by moving his or her face (hereinafter referred to as a face priority model); and a model obtained by learning, as training data, an image of the driver obtained when the driver directs his or her line of sight toward the object by moving merely his or her eyes and moving his or her face as little as possible (hereinafter referred to as an eye priority model). To execute the face priority processing, the drive recorder 101 detects the line of sight of the driver by applying the acquired image of the driver to the face priority model. To execute the eye priority processing, the drive recorder 101 detects the line of sight of the driver by applying the acquired image of the driver to the eye priority model.

The drive recorder 101 may alternatively select the face priority processing and the eye priority processing based on the speed of the vehicle 100. For example, the drive recorder 101 may execute the face priority processing when the speed of the vehicle 100 is 0, and execute the eye priority processing when the speed of the vehicle 100 is not 0. Alternatively, the drive recorder 101 may detect the line of sight by weighting the result of the face priority processing and the result of the eye priority processing using weights obtained as a function of the speed of the vehicle 100. The drive recorder 101 may determine the speed of the vehicle 100 based on the image by the front camera 203 or the in-vehicle camera 204, or may acquire the speed from the vehicle 100.

The drive recorder 101 performs calibration of line-of-sight detection processing to improve the accuracy of line-of-sight detection. The calibration is processing of adjusting a parameter for line-of-sight detection processing to reduce an error between the line of sight recognized by the drive recorder 101 and the actual line of sight. Specifically, the drive recorder 101 instructs the driver to look at a specific calibration position (for example, a front or corners of a windshield), and associates the calibration position with the image of the face of the driver looking at the calibration position. The calibration position is a position at which the driver is instructed to look to perform calibration. The drive recorder 101 individually performs calibration for each of the face priority processing and the eye priority processing. Either the face priority processing or the eye priority processing may be executed first.

The calibration method of the face priority processing will be described with reference to FIG. 4. The operation in FIG. 4 may be performed when the processor 201 of the drive recorder 101 executes a program read out to the storage device 202 (specifically, the memory). Alternatively, a part or all of the operations in FIG. 4 may be executed by a dedicated circuit such as an application specific integrated circuit (ASIC) or a field programmable gate array (FPGA). The operation in FIG. 4 may be started in response to receiving an instruction to start calibration from the driver. Calibration is performed while the vehicle is stopped to ensure safety.

In step S401, the processor 201 instructs the driver to take a driving posture. This instruction is output to the occupant by, for example, the output device 206 (for example, a speaker). Thereafter, the instruction to the driver may be output in the same manner. The driving posture is, for example, a posture of sitting on a seat and grasping a steering wheel as the driver does during driving. As an instruction for causing the driver to take such a posture, the processor 201 may provide a notification such as that saying, "Hold the steering wheel with both hands and take a driving posture" to the driver. The notification may be performed by voice or by indication on the display.

In step S402, the processor 201 selects an unprocessed one of the plurality of calibration positions set in advance. For example, the plurality of preset calibration positions include the front of the driver and the four corners of the windshield. The plurality of calibration positions may not include some of these or may include other positions. The settings of the plurality of calibration positions are stored in advance in the storage device 202. The unprocessed calibration position is a calibration position for which processing in steps S403 and S404 to be described later has not been performed.

In step S403, the processor 201 instructs the driver to look at the selected one calibration position (for example, the upper right of the windshield) by moving his or her face. Thereafter, the processor 201 waits for a predetermined time considered to be required for the driver to move the line of sight. Alternatively, the processor 201 may determine that the direction of the driver's face starts to move and then stops based on the image from the in-vehicle camera 204. The instruction to look at the calibration position by moving the face may explicitly include an instruction to move the face, such as that saying, "Please look at the upper right of the windshield by moving your face". Alternatively, the instruction to look at the calibration position by moving the face may implicitly include an instruction to move the face, such as that saying, "Take a natural look at the upper right of the windshield". This step is executed while the vehicle is stopped. Therefore, if the driver is instructed to take a natural look, the driver is considered to look at the calibration position by moving his or her face.

In step S404, the processor 201 acquires the image of the driver captured by the in-vehicle camera 204. This image includes the face of the driver looking at the calibration position the instruction of which is given. Thereafter, the processor 201 stores the acquired image in the storage device 202 in association with the selected calibration position.

In step S405, the processor 201 determines whether an unprocessed calibration position remains in the plurality of preset calibration positions. When the unprocessed calibration position remains ("YES" in step S405), the processor 201 returns the processing to step S402 and repeats steps S402 to S405. When the unprocessed calibration position does not remain ("NO" in step S405), the processor 201 shifts the processing to step S406.

In step S406, the processor 201 calibrates the face priority processing based on the image of the driver's face stored in the storage device 202 in association with the plurality of calibration positions. For example, the processor 201 may adjust the ratio of the movement distance of the line of sight to the movement amount of the face orientation based on the movement amount (movement angle) of the face orientation between the images and the distance between the calibration positions. When the face priority processing is performed by machine learning, the processor 201 performs calibration as follows, for example. First, a model having an input parameter that can correct the output of the DNN is selected as a DNN model. During calibration, the processor 201 adjusts this parameter so that the error between the output of the DNN and the actual calibration position is minimized. Since the distance between the calibration positions can vary depending on the vehicle type, the distance may be stored in the storage device 202 in advance.

Figure 5:
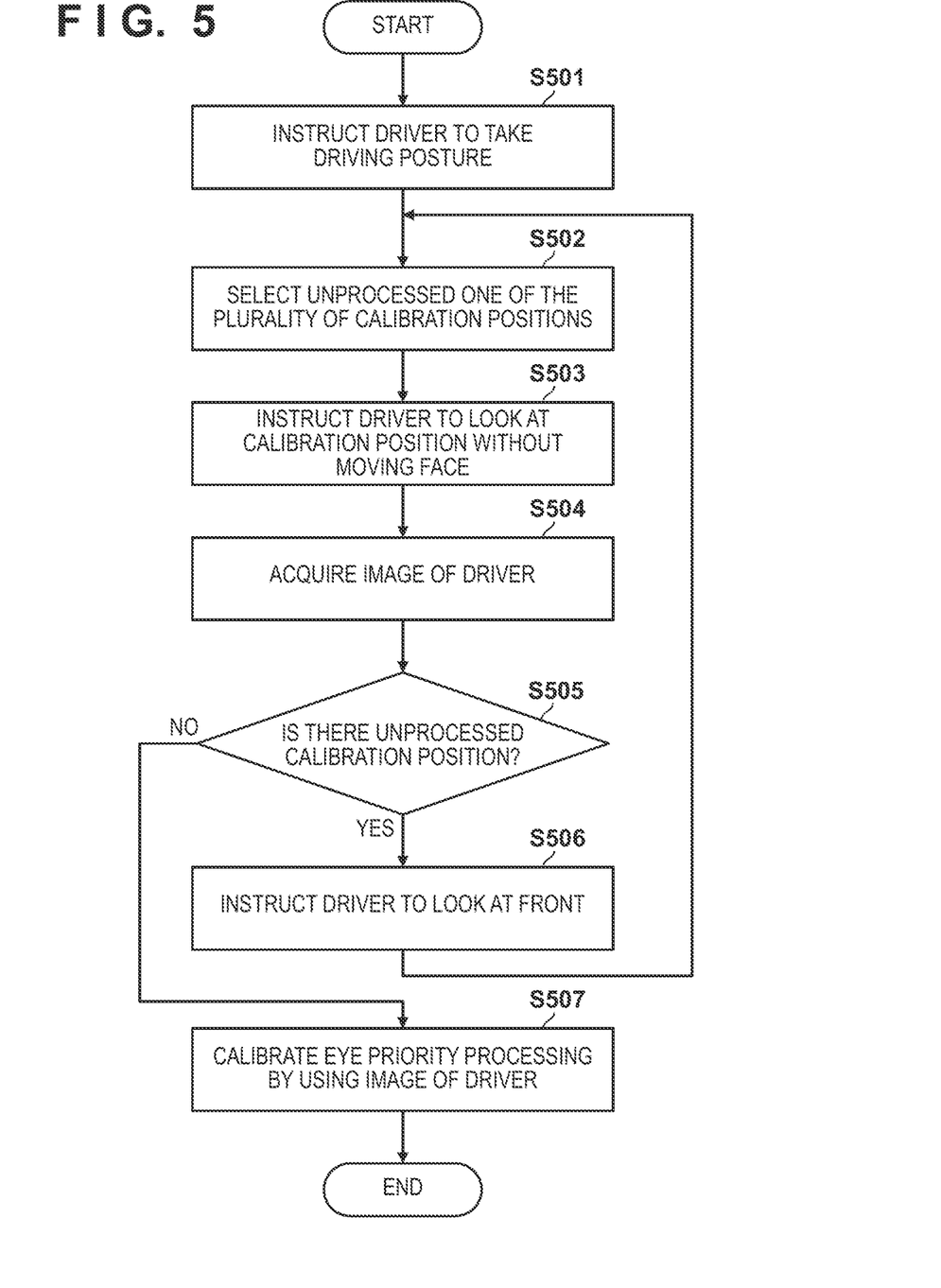
FIG. 5 is a flowchart illustrating an operation example of the drive recorder according to some embodiments of the present disclosure.

The calibration method of the eye priority processing will be described with reference to FIG. 5. The operation in FIG. 5 may be performed when the processor 201 of the drive recorder 101 executes a program read out to the storage device 202 (specifically, the memory). Alternatively, a part or all of the operations in FIG. 5 may be executed by the dedicated circuit such as an ASIC or an FPGA. The operation in FIG. 5 may be started in response to receiving an instruction to start calibration from the driver. Calibration is performed while the vehicle is stopped to ensure safety.

In step S501, the processor 201 instructs the driver to take a driving posture. Step S501 may be the same as step S401.

In step S502, the processor 201 selects an unprocessed one of the plurality of calibration positions set in advance. Step S502 may be the same as step S402. The plurality of calibration positions in calibration of the eye priority processing and the plurality of calibration positions in calibration of the face priority processing may be the same or different.

In step S503, the processor 201 instructs the driver to look at the selected one calibration position (for example, the upper right of the windshield) without moving his or her face. Thereafter, the processor 201 waits for a predetermined time considered to be required for the driver to move the line of sight. Alternatively, the processor 201 may determine that the position of the driver's eyes starts to move and then stops based on the image from the in-vehicle camera 204. The instruction to look at the calibration position without moving the face may explicitly include an instruction not to move the face, such as that saying, "Please look at the upper right of the windshield without moving your face". Alternatively, the instruction to look at the calibration position without moving the face may implicitly include an instruction not to move the face, such as that saying, "Look at the upper right of the windshield by moving only your eyes".

In step S504, the processor 201 acquires the image of the driver captured by the in-vehicle camera 204. This image includes the face (the eyes in particular) of the driver looking at the calibration position. Thereafter, the processor 201 stores the acquired image in the storage device 202 in association with the selected calibration position.

In step S505, the processor 201 determines whether an unprocessed calibration position remains in the plurality of preset calibration positions. When the unprocessed calibration position remains ("YES" in step S505), the processor 201 returns the processing to step S502 after executing step S506 and repeats steps S502 to S505. When the unprocessed calibration position does not remain ("NO" in step S505), the processor 201 shifts the processing to step S507. In step S506, the processor 201 instructs the driver to look in front of the driver. Details of this step will be described later.

In step S507, the processor 201 calibrates the eye priority processing based on the image of the driver's face stored in the storage device 202 in association with the plurality of calibration positions. For example, the processor 201 may adjust the ratio of the movement distance of the line of sight to the movement amount of the eyes based on the movement amount (movement angle) of the eye between the images and the distance between the calibration positions. When the eye priority processing is performed by machine learning, the processor 201 may perform calibration of the eye priority processing as in calibration of the face priority processing described above.

Figure 6:
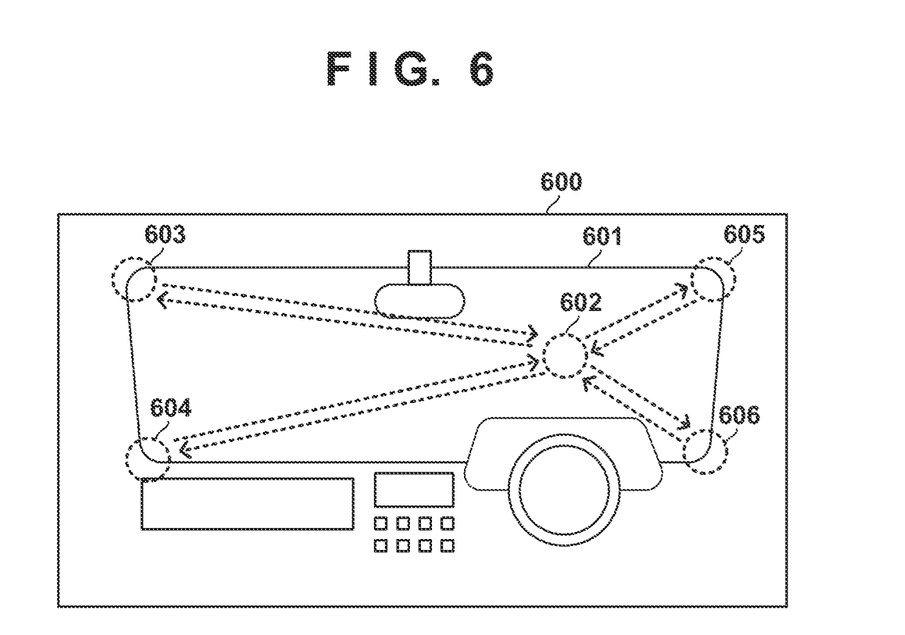
FIG. 6 is a schematic view illustrating a movement of a line of sight of a driver according to some embodiments of the present disclosure.

The change in the line of sight of the driver in the calibration method for the eye priority processing in FIG. 5 will be described with reference to FIG. 6. A field of view 600 indicates the field of view of the driver. The field of view 600 includes components on the front side of the cabin of the vehicle 100, such as a windshield 601 and a steering wheel. In the example in FIG. 6, the plurality of calibration positions include a position 602 that is in front of the driver and positions 603 to 606 that are at four corners of the windshield 601. None of the positions 603 to 606 are in front of the driver. The order of selecting the plurality of calibration positions may be arbitrary. The following description assumes that the calibration position is selected in step 502 in the order from the position 602 through to the position 606. In this example, the position 602 that is in front of the driver is selected first, but the position 602 may be selected halfway.

The processor 201 first instructs the driver to look at the position 602 that is in front of the driver and acquires the image of the face of the driver looking at the position 602. Then, the processor 201 instructs the driver to look at the position 603 that is not in front of the driver without moving his or her face and acquires the image of the face of the driver looking at the position 603. Subsequently, the position 604 is selected as the calibration position in step S502. Before instructing the driver to look at the position 604 that is not in front of the driver without moving his or her face, the processor 201 instructs the driver to look at the position 602 that is in front of the driver in step S506. The instruction may be an instruction to look in front of the driver by moving the face, or may be an instruction to look in front of the driver without moving the face. Since the photograph of the driver's face at the position 602 has already been acquired, the processor 201 may not acquire the photograph of the face of the driver looking at the position 602 again. After the driver looks at the position 602, the processor 201 gives an instruction to look at the position 604 that is not in front of the driver without moving his or her face. Similarly thereafter, the processor 201 instructs the driver to face frontward, as indicated by the arrows in FIG. 6, each time the calibration position switches to the positions 605 and 606.

Thus, according to some embodiments, when giving an instruction to look at the position that is not in front of the driver (the positions 603 to 606) of the plurality of calibration positions (the positions 602 to 606) without moving the face (that is, in calibration of the eye priority processing), the processor 201 gives an instruction to look in front of the driver (the position 602) each time the position at which the driver is instructed to look (the positions 602 to 606) to acquire the image of the driver's face switches from one position that is not in front of the driver (any of the positions 603 to 606) to another position that is not in front of the driver (any of the positions 603 to 606). Even if an instruction is given to look at the calibration position that is not in front of the driver (for example, the position 603) without moving the face, the face orientation of the driver slightly changes. For this reason, if an instruction is given to move the line of sight directly from one calibration position that is not in front of the driver (for example, the position 603) to another calibration position that is not in front of the driver (for example, the position 604), the eye position may be different as compared to a case where the line of sight is moved from the front of the driver (that is, the position 602) to the other calibration position (for example, the position 604). In the present embodiment, since an instruction is given to return the line of sight to the front of the driver each time the line of sight deviates from the front of the driver, calibration can be executed with high accuracy.

Figure 4:
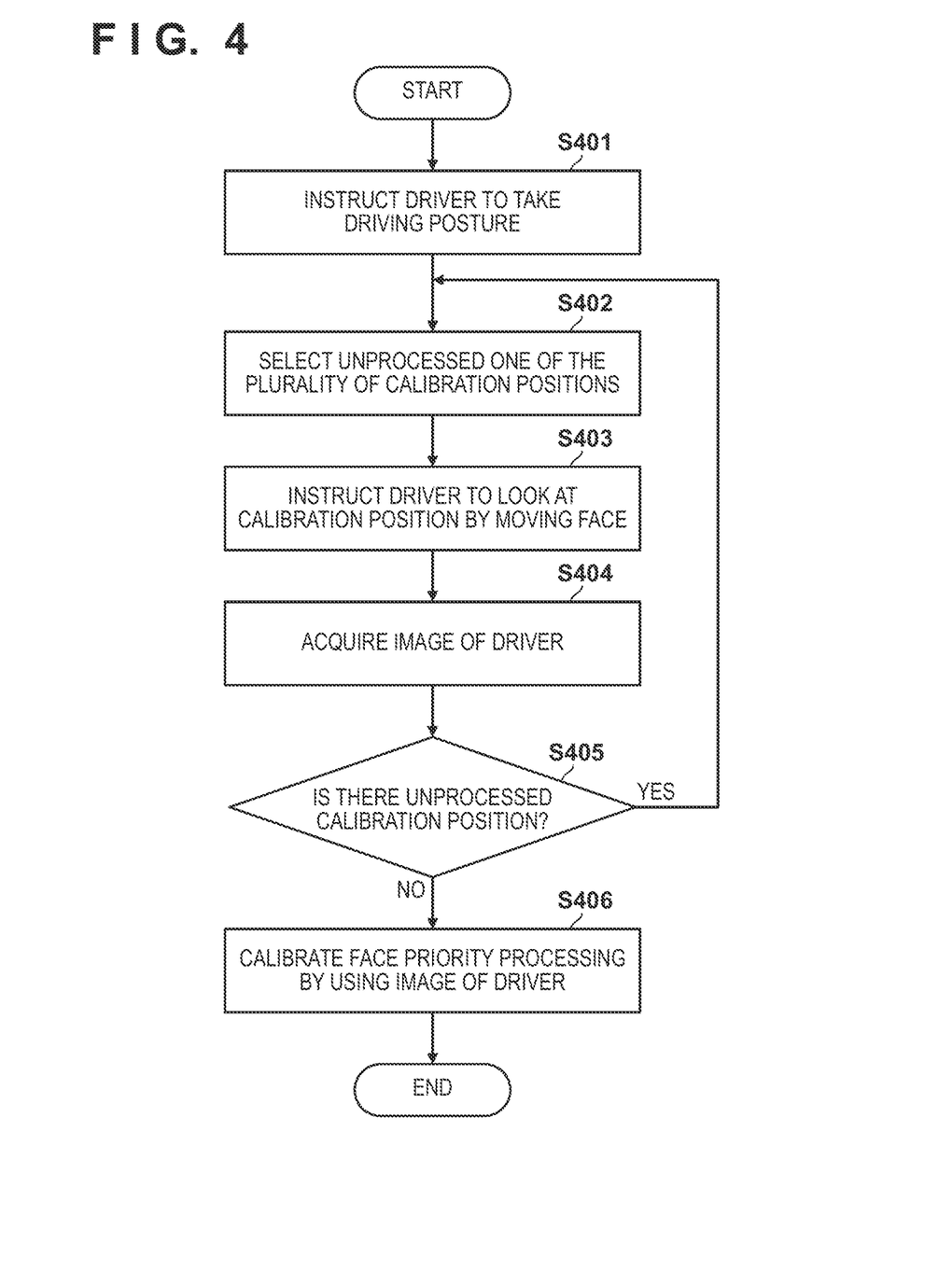
FIG. 4 is a flowchart illustrating an operation example of the drive recorder according to some embodiments of the present disclosure.

On the other hand, as described in FIG. 4, when giving an instruction to look at the position that is not in front of the driver (the positions 603 to 606) of the plurality of calibration positions (the positions 602 to 606) by moving the face (that is, in calibration of the face priority processing), the processor 201 may not give an instruction to look in front of the driver (the position 602) when the position at which the driver is instructed to look (the positions 602 to 606) to acquire the image of the driver's face switches from one position that is not in front of the driver (any of the positions 603 to 606) to another position that is not in front of the driver (any of the positions 603 to 606). This is because the orientations of the face are considered to be the same if the driver moves his or her line of sight by moving his or her face, regardless of the position at which the driver looks before the movement. As described above, by not giving an instruction to look in front for each calibration position, the time required for calibration can be shortened.

In the above-described embodiment, the face priority model is a model obtained by learning, as training data, the image of the driver obtained when the driver directs his or her line of sight toward the object by moving his or her face. Alternatively or additionally, the face priority model may be a model that is fitted while the face is moved during calibration. In addition, in the above-described embodiment, the eye priority model is a model obtained by learning, as training data, the image of the driver obtained when the driver directs his or her line of sight toward the object by moving merely his or her eyes and moving his or her face as little as possible. Alternatively or additionally, the eye priority model may be a model that is fitted while the eyes are moved without moving the face during calibration.

In the above-described embodiment, the drive recorder 101 functions as the line-of-sight detection device. Alternatively, the control ECU 102 incorporated in the vehicle 100 may function as the line-of-sight detection device. In this case, the control ECU 102 executes the operation of the drive recorder 101 described with reference to FIGS. 4 and 5. The control ECU 102 may acquire the image of the driver captured by the in-vehicle camera 204 of the drive recorder 101, or may acquire the image of the driver captured by another in-vehicle camera. In the latter case, the drive recorder 101 may be omitted.

SUMMARY OF EMBODIMENTS

Item 1. A calibration device (101) for calibrating line-of-sight detection processing based on an image of a face of a user (301), the calibration device comprising:
an instruction unit (201) configured to instruct the user to look at each of a plurality of positions (602-606); and
an acquisition unit (201) configured to acquire, for each of the plurality of positions (602-606), the image (300) of the face of the user looking at each position,
wherein the instruction unit is configured to, when giving an instruction to look at a position (603-606) that is not in front of the user of the plurality of positions without moving the face, give an instruction to look in front of the user each time a position at which the user is instructed to look to acquire the image of the user's face switches from one position that is not in front of the user to another position that is not in front of the user.

According to this item, since calibration of line-of-sight detection processing can be appropriately performed, the accuracy of line-of-sight detection is improved.

Item 2. The calibration device according to Item 1, wherein the instruction unit is configured to, when giving an instruction to look at the position that is not in front of the user of the plurality of positions without moving the face, give an instruction to look in front of the user by moving the face each time the position at which the user is instructed to look to acquire the image of the user's face switches from the one position that is not in front of the user to the other position that is not in front of the user.

According to this item, calibration of line-of-sight detection processing can be further appropriately performed.

Item 3. The calibration device according to Item 1 or 2, wherein the plurality of positions include a corner of a windshield (601) of a vehicle (100) in which the user rides.

According to this item, calibration of line-of-sight detection processing can be further appropriately performed.

Item 4. The calibration device according to any of Items 1-3, wherein the instruction unit is configured to instruct the user to grasp a steering wheel before instructing the user to look at the plurality of positions.

According to this item, there is a higher possibility that the user takes a driving posture during calibration.

Item 5. The calibration device according to any of Items 1-4, wherein the instruction unit is configured not to, when giving an instruction to look at the position that is not in front of the user of the plurality of positions by moving the face, give an instruction to look in front of the user when the position at which the user is instructed to look to acquire the image of the user's face switches from the one position that is not in front of the user to the other position that is not in front of the user.

According to this item, the processing time for calibration of line-of-sight detection processing is shortened.

Item 6. A drive recorder (101) that functions as the calibration device according to any of Items 1-5.

According to this item, line-of-sight detection can be performed by an externally attachable drive recorder.

Item 7. A vehicle (100) comprising a control device (102) that functions as the calibration device according to any of Items 1-5.

According to this item, line-of-sight detection can be performed by the vehicle.

Item 8. A program for causing a computer to function as each unit of the calibration device according to any of Items 1-5.

According to this item, a program that constitutes the above-described calibration device is provided.

Item 9. A method for calibrating line-of-sight detection processing based on an image of a face of a user (301), the method comprising:
instructing (S503) the user to look at each of a plurality of positions (602-606); and
acquiring (S504), for each of the plurality of positions, the image of the face of the user looking at each position,
wherein when giving an instruction to look at a position that is not in front of the user of the plurality of positions without moving the face, an instruction to look in front of the user is given (S506) each time a position at which the user is instructed to look to acquire the image of the user's face switches from one position that is not in front of the user to another position that is not in front of the user.

According to this item, since calibration of line-of-sight detection processing can be appropriately performed, the accuracy of line-of-sight detection is improved.

The invention is not limited to the foregoing embodiments, and various variations/changes are possible within the spirit of the invention.

What is claimed is:

1. A calibration device for calibrating line-of-sight detection processing based on an image of a face of a user, the calibration device comprising at least one processor circuit and a memory storing instructions, that when executed by the processor circuit, cause the processor circuit to at least:
instruct the user to look at each of a plurality of positions; and
acquire, for each of the plurality of positions, the image of the face of the user looking at each position,
wherein the instructions, that when executed by the processor circuit, cause the processor circuit to, when giving an instruction to look at a position that is not right in front of the user of the plurality of positions without moving the face, give an instruction to look right in front of the user each time a position at which the user is instructed to look to acquire the image of the user's face switches from one position that is not right in front of the user to another position that is not right in front of the user,
wherein the image of the face is acquired by a camera and stored in a storage device, and
wherein the instructions, that when executed by the processor circuit, cause the processor circuit to calibrate the line-of-sight detection processing based on the image of the face stored in the storage device in association with the plurality of calibration positions.

2. The calibration device according to claim 1, wherein the instructions, that when executed by the processor circuit, cause the processor circuit to, when giving an instruction to look at the position that is not right in front of the user of the plurality of positions without moving the face, give an instruction to look right in front of the user by moving the face each time the position at which the user is instructed to look to acquire the image of the user's face switches from the one position that is not right in front of the user to the other position that is not in right front of the user.

3. The calibration device according to claim 1, wherein the plurality of positions include a corner of a windshield of a vehicle in which the user rides.

4. The calibration device according to claim 1, wherein the instructions, that when executed by the processor circuit, cause the processor circuit to instruct the user to grasp a steering wheel before instructing the user to look at the plurality of positions.

5. The calibration device according to claim 1, wherein the instructions, that when executed by the processor circuit, cause the processor circuit not to, when giving an instruction to look at the position that is not right in front of the user of the plurality of positions by moving the face, give an instruction to look right in front of the user when the position at which the user is instructed to look to acquire the image of the user's face switches from the one position that is not right in front of the user to the other position that is not right in front of the user.

6. A drive recorder that functions as the calibration device according to claim 1.

7. A vehicle comprising a control device that functions as the calibration device according to claim 1.

8. A non-transitory storage medium comprising a program for causing a computer to function as the calibration device according to claim 1.

9. A method for calibrating line-of-sight detection processing based on an image of a face of a user, the method comprising:

instructing the user to look at each of a plurality of positions;

acquiring, by a camera, for each of the plurality of positions, the image of the face of the user looking at each position and storing the image in a storage device;

calibrating the line-of-sight detection processing based on the image of the face stored in the storage device in association with the plurality of calibration positions, wherein when giving an instruction to look at a position that is not right in front of the user of the plurality of positions without moving the face, an instruction to look right in front of the user is given each time a position at which the user is instructed to look to acquire the image of the user's face switches from one position that is not right in front of the user to another position that is not right in front of the user.

* * * * *